United States Patent
Zeroug et al.

(10) Patent No.: US 9,534,487 B2
(45) Date of Patent: Jan. 3, 2017

(54) CEMENT ACOUSTIC PROPERTIES FROM ULTRASONIC SIGNAL AMPLITUDE DISPERSIONS IN CASED WELLS

(71) Applicant: SCHLUMBERGER TECHNOLOGY CORPORATION, Sugar Land, TX (US)

(72) Inventors: Smaine Zeroug, Lexington, MA (US); Jiaqi Yang, Belmont, MA (US); Sandip Bose, Chestnut, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 243 days.

(21) Appl. No.: 14/157,359

(22) Filed: Jan. 16, 2014

(65) Prior Publication Data

US 2015/0198732 A1    Jul. 16, 2015

(51) Int. Cl.
*G01V 1/50* (2006.01)
*E21B 47/00* (2012.01)

(52) U.S. Cl.
CPC ............. *E21B 47/0005* (2013.01); *G01V 1/50* (2013.01)

(58) Field of Classification Search
CPC .............................. G01V 1/50; E21B 47/0005
USPC .......................................................... 367/35
See application file for complete search history.

(56) References Cited

U.S. PATENT DOCUMENTS

| | | | |
|---|---|---|---|
| 5,243,855 A | | 9/1993 | Stieger et al. |
| 5,555,218 A | * | 9/1996 | Chambers ............. G01V 1/362 367/47 |
| 5,987,385 A | * | 11/1999 | Varsamis ............ E21B 47/0002 702/6 |
| 6,633,857 B1 | * | 10/2003 | Tipping ............... G06N 3/0472 706/16 |
| 7,522,471 B2 | | 4/2009 | Froelich et al. |
| 7,649,805 B2 | * | 1/2010 | Bose ........................ G01V 1/48 367/38 |

(Continued)

FOREIGN PATENT DOCUMENTS

| | | |
|---|---|---|
| WO | 2010/019315 A1 | 2/2010 |
| WO | 2010/080355 A2 | 7/2010 |

OTHER PUBLICATIONS

Aeron et al., "Automatic Dispersion Extraction using Continuous Wavelet Transform," IEEE International Conference on Acoustics, Speech and Signal Processing, 2008: pp. 2405-2408.

(Continued)

*Primary Examiner* — Daniel L Murphy
(74) *Attorney, Agent, or Firm* — Jakub Michna

(57) ABSTRACT

Apparatus and methods for characterizing the physical state of a barrier installed in a borehole traversing a formation including locating an ultrasonic tool with a plurality of spaced receivers and a transmitter at a location in the borehole, activating the ultrasonic tool to form ultrasonic waveforms, wherein the spaced receivers record the ultrasonic waveforms, aligning the transmitter and the spaced receivers, wherein the ultrasonic waveforms comprise propagated Lamb modes, processing the ultrasonic waveforms to obtain a first amplitude dispersion plot of attenuation as a function of frequency and first phase dispersion plot of phase velocity as a function of frequency, processing attenuation dispersions to identify discontinuities, and relating the discontinuities to barrier wavespeeds.

33 Claims, 15 Drawing Sheets

(56) References Cited

U.S. PATENT DOCUMENTS

| | | | |
|---|---|---|---|
| 8,126,647 B2* | 2/2012 | Hruska | G01V 11/00 702/7 |
| 2006/0122525 A1 | 6/2006 | Shusterman | |
| 2006/0198243 A1 | 9/2006 | Tang et al. | |

OTHER PUBLICATIONS

Prosser et al., "Time-frequency analysis of the dispersion of Lamb modes," J. Acoust. Soc. Am., May 1999, vol. 105(5): pp. 2669-2676.

Roueff et al., "Dispersion Estimation from Linear Array Data in the Time-Frequency Plane," IEEE Transactions on Signal Processing, Oct. 2005, vol. 53(10): pp. 3738-3748.

Van Kuijk et al., "IPTC 10546: A Novel Ultrasonic Cased-Hole Imager for Enhanced Cement Evaluation," International Petroleum Technology Conference, Nov. 2005: pp. 1-14.

Zeroug, "Analytical Modeling for Fast Simulations of Ultrasonic Measurements on Fluid-Loaded Layered Elastic Structures," IEEE Transactions on Ultrasonics, Ferroelectrics, and Frequency Control, May 2000, vol. 47(3): pp. 565-574.

Bellabarba et al., "Ensuring Zonal Isolation Beyond the Life of the Well," Oilfield Review, 2008: pp. 18-31.

Ekstrom, "Dispersion Estimationi from Borehole Acoustic Arrays Using a modified Matrix Pencil Algorithm," 29th Asilomar Conference on Signals System. Comput., Oct. 1995: pp. 449-453.

Zeroug, "Forward Modeling for Ultrasonic Leaky Lamb-Wave Based Imaging Through a Highly Contrasting Steel Cylindrical-Layer," IEEE Ultrasonics Symposium, 2004: pp. 672-675.

Zeroug et al., "Ultrasonic Leaky-Lamb Wave Imaging Through a Highly Contrasting Layer," IEEE Ultrasonics Symposium, 2003: pp. 794-798.

International Search Report and Written Opinion for corresponding PCT Application No. PCT/US2014/070249 dated Mar. 31, 2015, 13 pages.

* cited by examiner

CEMENT ACOUSTIC PROPERTIES FROM ULTRASONIC SIGNAL AMPLITUDE DISPERSIONS IN CASED WELLS

FIELD

Embodiments of this invention relate to using ultrasonic signal amplitude frequency dispersions to quantify cement properties.

BACKGROUND

Acoustic evaluation of well cement integrity is important to determine if cement or an equivalent sealing material has been placed in the annulus between casing and formation and if it provides hydraulic zonal isolation between formation strata traversed by the drilled well. Failed zonal isolation can lead to significant consequences on the environment as well as on the economic viability of well production.

SUMMARY

Embodiments herein relate to apparatus and methods for characterizing the physical state of a barrier installed in a borehole traversing a formation including locating an ultrasonic tool with a plurality of spaced receivers and a transmitter at a location in the borehole, activating the ultrasonic tool to form ultrasonic waveforms, wherein the spaced receivers record the ultrasonic waveforms, aligning the transmitter and the spaced receivers, wherein the ultrasonic waveforms comprise propagated Lamb modes, processing the ultrasonic waveforms to obtain a first amplitude dispersion plot of attenuation as a function of frequency and first phase dispersion plot of phase velocity as a function of frequency, processing attenuation dispersions to identify discontinuities, and relating the discontinuities to barrier wavespeeds.

FIGURES

DETAILED DESCRIPTION

Figure 1:
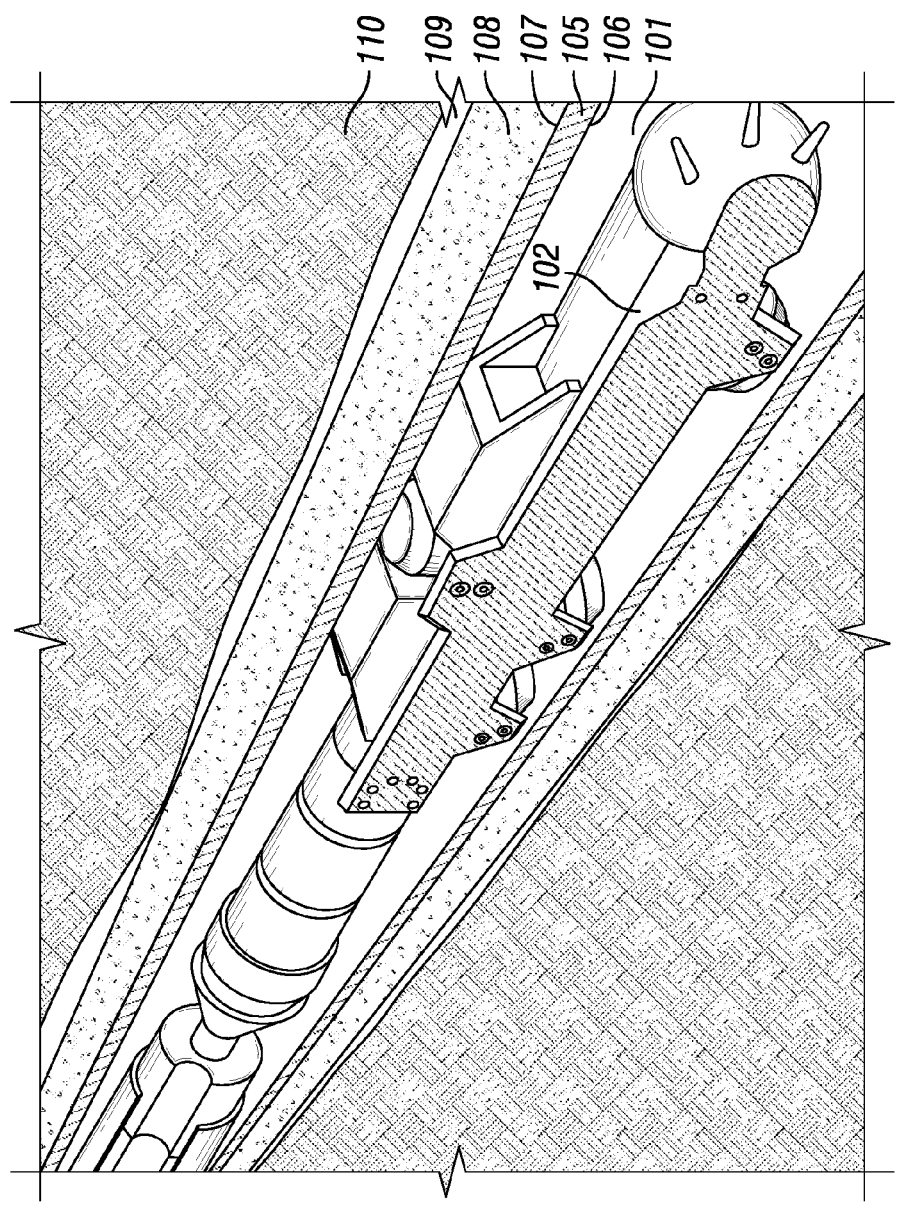
FIG. 1 is a schematic, sectional view of a cased wellbore traversing a formation with casing and cement, being logged by a Schlumberger ultrasonic cement evaluation tool.

Providing an effective barrier in a casedhole traversing a subterranean formation, often referred to as zonal isolation, requires a sophisticated mix of drilling and completion design, material selection and placement, and practical implementation as illustrated in FIG. 1. FIG. 1 provides a sectional view of a wellbore 101 containing an acoustic tool 102 that is used to evaluate the cemented annulus 108 between casing 105 and formation 110. The wellbore 101 is encompassed by casing 105. The casing 105 shares a casing-wellbore surface 106 with the wellbore 101 and a cement-casing surface 107 with the cement 108. Similarly, the cement 108 shares a cement-formation surface 109 (sometimes referred to as annulus) with the formation 110. These components work together to form a barrier 111 between the wellbore 101 and the formation 110.

The cement 108 and surfaces 107 and 109 between the casing and cement and formation may be continuous and homogenous, reflecting materials in complete contact with each other, forming a continuous seal across materials. Delamination, debonding, fluid incursion, poorly cured cement, chemical reactions and erosion in combination with other factors may yield surfaces that are not completely in contact with each other, and or cement that poor sealing properties. That is, the exterior of the cement at surface 107 may or may not meet with the exterior of the casing at surface 107, similarly, the exterior of the cement at surface 109 may not completely abut the exterior surface of the formation at surface 109. These surface bond inconsistencies may allow undesirable fluid flow and resulting barrier failure. Similarly, the cement 108 may not be continuous and or strong enough to prevent undesirable fluid flow within it, resulting hence in barrier failure. FIG. 1 has only one set of casing and cement. In some embodiments, there may be multiple casings surrounded by multiple cement components. For instance, this is the case in the shallow parts of the well where a surface casing, intermediate casing, and production casing may overall in certain depth sections. Further, a production tubing within the production casing may also be present.

A number of factors have influence on the quality of the annulus cementation [reference Oilfiled Review article:

"Ensuring Zonal Isolation Beyond the Life of the Well," Schlumberger Oilfield Review (2008) Publication]. For instance, if drilling fluids are left on the casing and on the formation wall, then good bonding between cement and formation or casing is impeded. Further, or if drilling fluids mix with the cement slurry and the mix remains in liquid state, channels of communication between zones along the borehole are likely to form. Poorly drilled holes may have washouts areas that trap gelled drilling fluids and that can contaminate cement slurry preventing adequate curing. Poor casing centralization may also undermine good cement placement since the cement slurry will have difficulty to displace logging fluids on the narrow annulus side. In some environments, there may be a vile mixture of these factors that promote barrier failure.

Acoustic measurement of the barrier can help identify problems. Typically, acoustic wave energy excited with acoustic transducers is beamed towards the casing while the transducers scan azimuthally the casing. Elastic wave energy is then excited within the casing and may be radiated into the annulus between casing and formation (or between a primary casing and a secondary one as it occurs for multiple string situations). Part of the energy may radiate back into the wellbore where it is detected with one or multiple acoustic transducers. Some embodiments may utilize transducers that are clamped directly to the casing to excite and detect elastic wave energy in the casing and the annulus.

Within embodiments that utilize acoustic transducers not clamped to the casing, two types of configurations are used. The first configuration employs a pulse-echo measurement whereby a single transducer is used to excite the casing and detect the echoes that propagate back. This is done with the transducer aperture radiating a beam pointing normally or near-normally to the casing surface. Variations of this may include a transducer with a split aperture into two sections, whereby the first section radiates and the second section detects acoustic wave energy reflected from the casing surface.

The second configuration employs a pitch-catch configuration whereby at least one, or more, transmitting transducer and at least one or more receiving transducers are utilized. One embodiment of this technique is implemented in the flexural wave imager on Schlumberger's ISOLATIONSCANNER™. This tool is commercially available from Schlumberger Technology Corporation of Sugar Land, Tex. Depending on the orientation angle of the transmitting and receiving transducers, one of more than one quasi-Lamb modes of the casing can be excited and detected. In the IsolationScanner, one transmitter and two receivers are utilized. Further, the transducers angles and separation are optimized to excite and detect the casing flexural mode aka as the lowest antisymmetric quasi-Lamb mode ($A_0$). Note the denomination of quasi-Lamb refers to the fact the steel casing which is cylindrical in geometry can support modes that are close in characteristics to the true Lamb modes that can be supported by a steel plate of the same thickness and material properties.

Two attributes of the received signals are used to invert for the cement properties: (i) the attenuation of the flexural attenuation (Flex_ATT) used to discriminate cement from liquid and gas, and (ii) the reflection echo at the cement-formation interface, referred to as the third-interface echo or TIE, used to invert for the cement wavespeed. Depending on the cement properties, the TIE can be single or multiples. It is a single shear-shear (SS) reflection echo for a cement that is acoustically fast such as non-mud-contaminated class H cements. The TIE is made of two or three echoes representing compressional-compressional (PP), converted PS/SP, and SS reflections for a cement that is acoustically slow such as lightweight and foam cements. Inversion of these echoes yield either the cement compressional wavespeed (Vp) or shear wavespeed (Vs) or both depending on the echoes tracked and available for inversion.

Some embodiments may extend the pitch-catch technique implemented in the ISOLATIONSCANNER™ with an array of receiving elements instead of the two receivers that are implemented in this tool, as well as with an array of transmitters. Embodiments herein include methods for processing of the data acquired with an array of closely-spaced receivers in a similar pitch-catch configuration utilized for the ISOLATIONSCANNER™. Herein, we also describe using ISOLATIONSCANNER™ data to glean more information than historically readily available.

The method herein relates to array processing to estimate dispersion information of the signals received by the receiver array. The ultrasonic signals of interest relate to the excitation and detection of the fundamental quasi-Lamb modes of the casing: the zeroth-order anti-symmetric mode ($A_0$) referred to as the flexural mode and the zeroth-order symmetric mode ($S_0$) referred to as the extensional mode. It should be noted that the method can also accommodate processing of additional quasi-Lamb modes of higher-order ($A_1$, $A_2$, $S_1$, $S_2$, etc.). Where these modes are excited and detected, their amplitude dispersions can also be used for inverting the cement properties.

Modeling and experimental data show that array processing to estimate dispersion information related to the received signals can provide signatures that are directly related to the cement wavespeeds (or mechanical properties such as bulk and shear moduli if the cement density is assumed to be known or measured independently.). Generally, knowledge of the wavespeeds provides direct, unambiguous and quantitative evidence on the presence of solid cement in the annulus. The inverted wavespeeds can also be employed to predict the longevity of the cement sheath during the life of the well, particularly if measurements are taken in a time-lapse manner to monitor the time evolution of the mechanical strength of the cement sheath. That is, the changes may be used to estimate the longevity of the mechanical integrity of the barrier. Further, perturbations of the estimated dispersion information across depth zones or azimuthal ranges can be related to cement defects such as contamination by mud, cracking, as well as the existence of channels that may permit hydraulic channeling. Such processing is analogous to the array processing conducted for sonic logging signals to extract slowness dispersions of the borehole modes. Herein, we use an inversion method to evaluate the mechanical properties of cement sheaths in a cased and cemented well and describe the use of the signal amplitude dispersion and phase dispersion for inverting for the cement wavespeeds. Dispersion refers to the variation of the attribute in question (phase or amplitude) within the frequency bandwidth of the detected signal.

Figure 2:
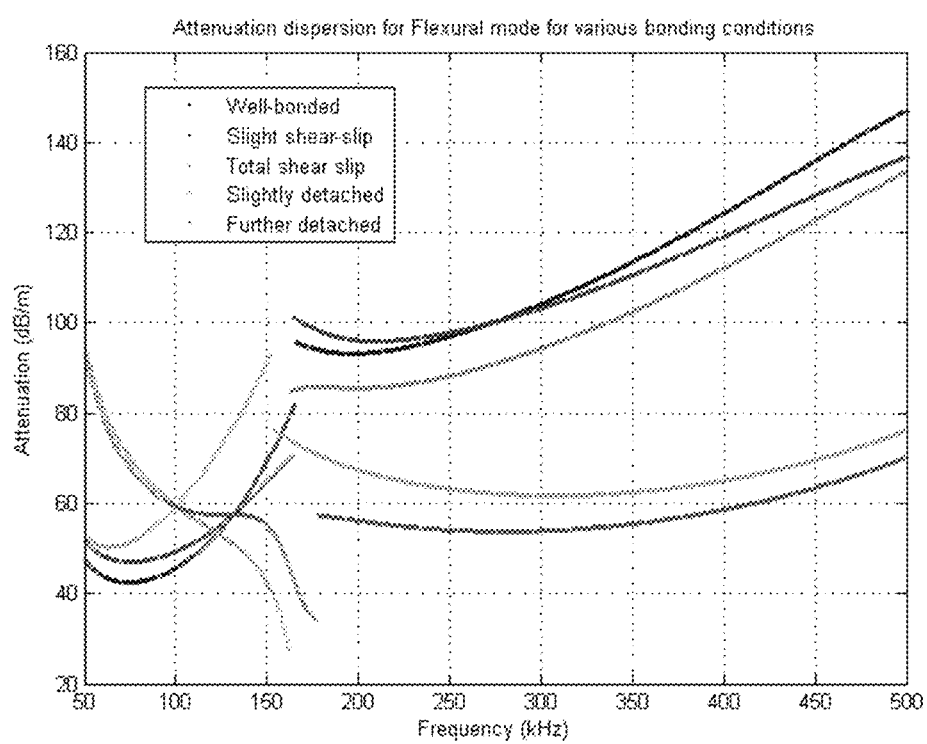
FIG. 2 is a plot of signal amplitude attenuation as a function of frequency for the flexural mode.
Figure 3:
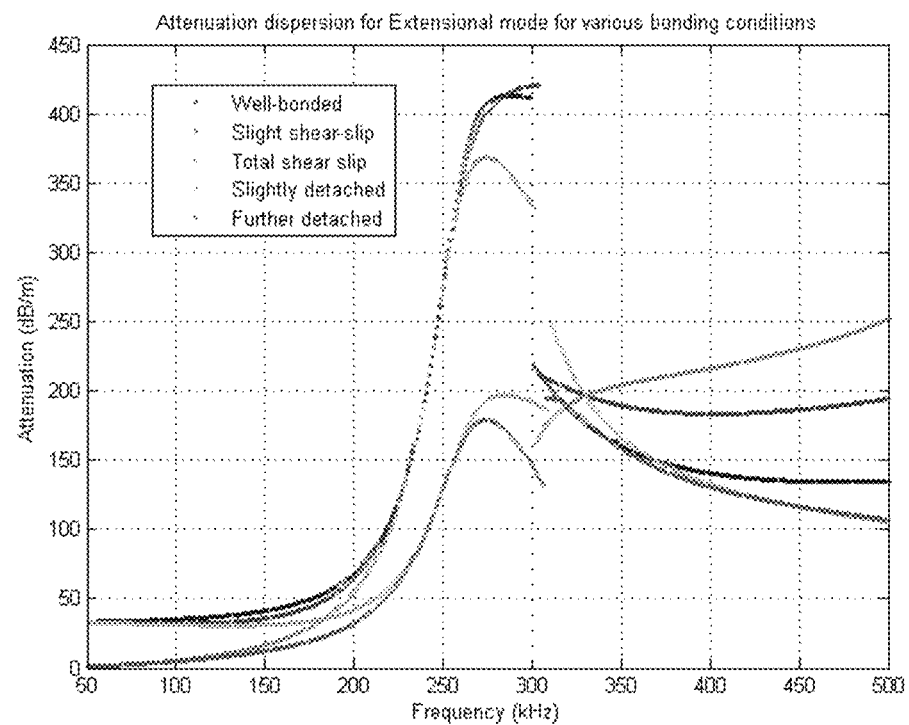
FIG. 3 is a plot of signal amplitude attenuation as a function of frequency for the extensional mode.

The signal amplitude dispersions are expected to exhibit discontinuities at specific frequencies. A discontinuity refers to a sharp change in the value of the attribute or to a sharp change in the trend of the attribute with frequency. FIG. 2 depicts the attenuation dispersion for the casing flexural mode for a $\frac{3}{8}$"-thick casing surrounded by water from the inside and cement at the outside. The various curves represent various bonding conditions at the casing-cement interface. FIG. 2 depicts attenuation of the casing flexural mode as a function of frequency for a water-steel-cement configuration for various bonding conditions of the casing-cement interface. Note the discontinuity in the curves at around 150-170 kHz irrespective of the bond condition, except when the cement is completely detached for which there is no discontinuity. The cement used in this example has compressional wavespeed, Vp, equal 2600 m/s. The attenuation is lower below this frequency and higher above it. FIG. 3 is similar to FIG. 2 but depicts the attenuation corresponding to the casing extensional mode as a function of frequency for a water-steel-cement configuration for various bonding conditions of the casing-cement interface. The cement used for this example has Vp equal to 3625 m/s. Here the discontinuity occurs at around 0.3 MHz and the attenuation is higher below this frequency and lower above it.

These discontinuities are related to the transition between the regime where the propagating quasi-Lamb mode in question can radiate compressional or shear energy into the cement sheath, for which the amplitude attenuation is high, and the regime where it cannot radiate energy for one of these waves, for which the attenuation is low. Initially, we review the physics of wave propagation of the quasi-Lamb modes and their radiation into the cement sheath, and then provide illustrative workflows for the embodiments herein.
Snell's Law—Propagation Versus Evanescence in the Cement The transfer of energy from the transmitting transducers immersed in the borehole fluid to the cement sheath is carried out via the casing quasi-Lamb modes, either flexural mode or the extensional mode or a higher-order mode. In the following, we'll limit ourselves to the flexural and extensional modes keeping in mind the same physics applies to the higher-order modes. At every frequency, Snell's law requires that the horizontal slowness be the same in the borehole fluid, the steel layer, and the cement medium. Hence, for the flexural mode with phase velocity denoted by $v_{flex}(w)$, $$\frac{\sin\{\theta(\omega)\}}{v_{fluid}} = \frac{1}{v_{flex}(\omega)} = \frac{\sin\{\theta_{P,S}(\omega)\}}{v_{P,S}}$$

Where $v_{fluid}$ is the sound wavespeed in the borehole fluid with propagation angle $\theta(w)$ estimated from the normal to the casing surface, while $v_{P,S}$ refers to either the compressional (P) or shear (S) wavespeeds in the cement with corresponding propagation angles $\theta_{P,S}$. For simplicity, we have assumed that waves propagate in the fluid and cement without undergoing dispersion (This is a fair assumption but heavy muds and lightweight and/or foam cements may require other assumptions.). A corresponding equation can be written for the extensional mode.

Figure 4:
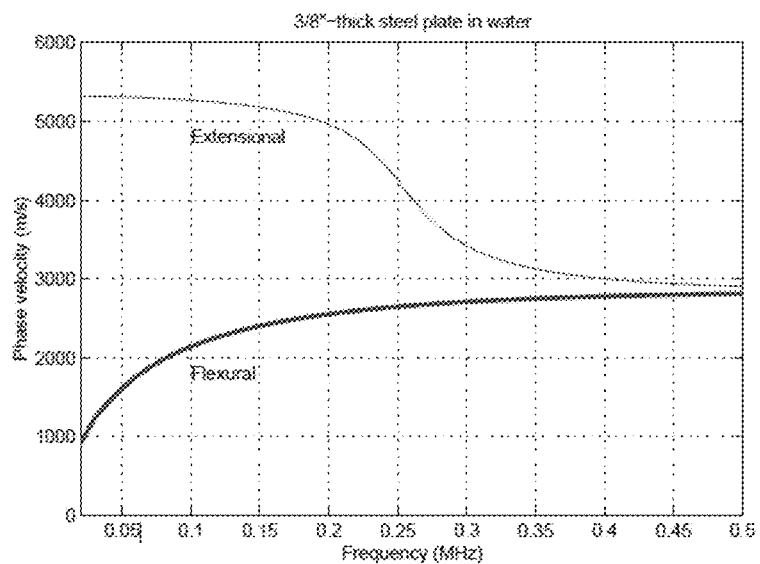
FIG. 4 is a plot of phase velocity as a function of frequency for the flexural and extensional modes for a ⅜ inch thick steel plate in water.

The characteristics of $v_{flex}$ and corresponding wavespeed for the extensional mode, $v_{ext}$, are imposed by the steel elastic properties and thickness. FIG. 4 shows the dispersion characteristics of the flexural and extensional (Lamb) modes for a ⅜ inch thick steel plate in water (A plate is a good approximation to the cylindrical casing in our high-frequency range of interest.).

The equation above provides the phase-matching condition for either the flexural or extensional mode to launch a bulk wave in the cement. However, depending on the ratio of $v_{P,S}$ to $v_{flex}$ the angle of propagation in the cement can be real or imaginary. For the wave to propagate inside the cement sheath as a bulk wave, its angle, $\theta_{P,S}$, has to be real. This imposes that $v_{P,S} < v_{flex}$ for the flexural mode to radiate propagating energy into the cement. Similarly it imposes that $v_{P,S} < v_{ext}$ for the extensional mode to radiate propagating energy into the cement. When this condition is not satisfied for either one or both cement wavespeeds ($v_{P,S}$), then the corresponding wave(s) are evanescent (i.e., not propagating) in the cement sheath.

Figure 5:
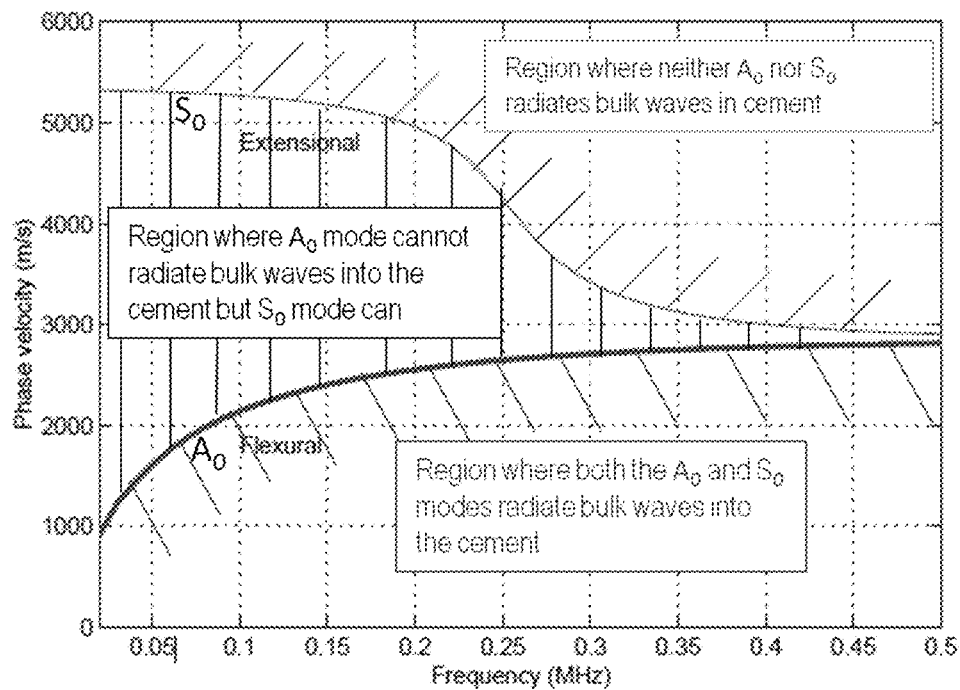
FIG. 5 is a plot of phase velocity as a function of frequency with delineation of regions of propagation and non propagation of bulk waves in the annulus.

As FIG. 5 depicts, three regions in the frequency-velocity dispersion plane can be defined in terms of whether the flexural and extensional modes can radiate bulk wave energy into the cement sheath. The casing flexural and extensional wave velocity dispersion curves demark regions for three regimes of propagation in the cement sheath. Bulk wave propagation occurs in the cement from any of the two modes whenever the mode phase velocity is greater than the bulk wavespeed in the cement. When the casing mode phase velocity is greater than the cement bulk wavespeed, the mode can radiate bulk waves into the cement. When it is not the case, the radiated energy into the cement remains trapped next to the casing as an evanescent wave. Note that the mode can still radiate into the fluid at the other side. The casing flexural and extensional wave velocity dispersion curves demark then regions for three regimes of propagation in the cement sheath.

Figure 6:
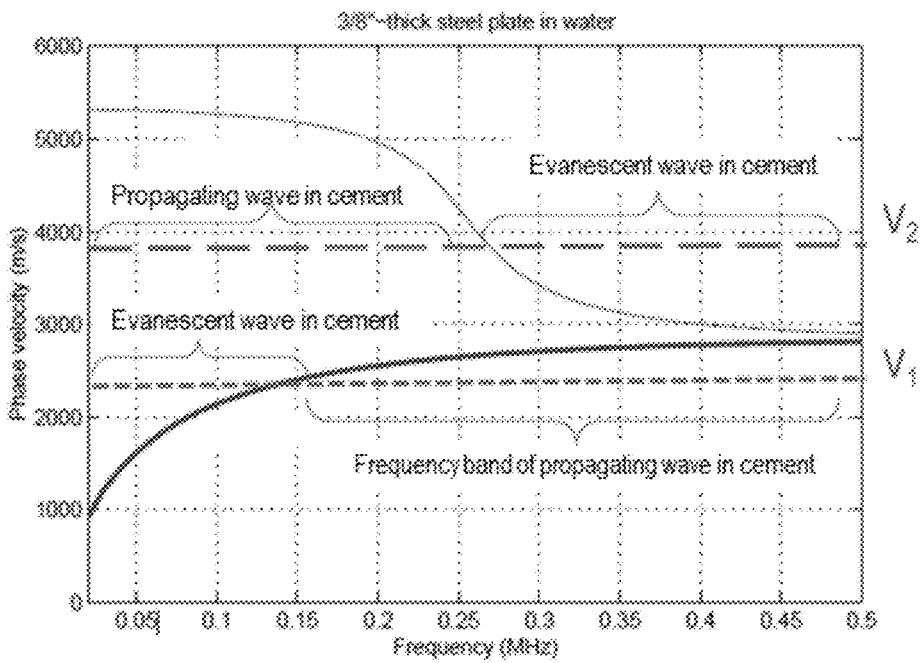
FIG. 6 is a plot of phase velocity as a function of frequency with delineation of frequency ranges of propagation and non propagation (or evanescence) for assumed values of wavespeed in the annulus.

FIG. 6 is the same as FIG. 5 but depicts two examples of a cement compressional wavespeed V1 around 2350 m/n and a second with a compressional wavespeed V2 around 3800 m/s. Both values are actually realistic for oilwell cement compressional wavespeeds. For instance, lightweight/foamy cements can have Vp at 2350 m/s and around it, while class H cements have higher Vp around 3800 m/s. For the former, the extensional mode will radiate a compressional bulk wave into the cement whereas the flexural will only do so for the indicated higher band of frequencies (f>150 kHz) for which the flexural phase velocity is higher (supersonic) than V1. For the latter, the flexural will not radiate compressional bulk wave in the cement, whereas the extensional will do so in the lower frequency band as indicated (f<260 kHz). Non propagating energy becomes evanescent in the cement. The same conclusions would apply for shear wave propagation in the cement if V1 or V2 were to denote shear wavespeeds. The intersections of a horizontal line at $V_1$ or $V_2$ with the flexural and extensional mode dispersion curves indicate the transition frequency at which the propagation regime in the cement changes from propagatory to evanescent or the other way around. The difference in the curvature of both mode dispersions leads to a reverse in propagation regime with respect to frequency range, as can be gathered from FIG. 6.

The relation between bulk propagation or evanescence in the cement sheath and casing mode amplitude attenuation is rather simple. While propagating in the casing, the flexural or extensional mode radiates energy back into the borehole fluid as well as into the cement sheath. However, the extent of radiation into the cement is high when there is radiation of a bulk wave and low when there is evanescence. At the transition frequency as indicted in FIG. 6, we expect the amplitude attenuation to exhibit a noticeable change.
Using the Discontinuity in the Attenuation Dispersions The frequency at which the mode attenuation dispersion exhibits discontinuity can then be used in conjunction with the mode wavespeed dispersions, shown in FIG. 4, to read off the wavespeed corresponding to this discontinuity.

Figure 7:
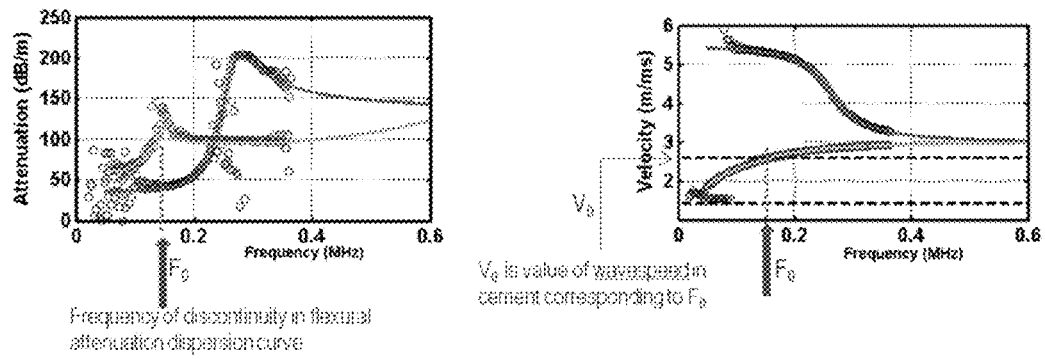
FIG. 7 is a plot of signal amplitude attenuation as a function of frequency (left) and a plot of phase velocity (right) for the flexural and extensional modes.

FIG. 7 depicts the general concept, providing dispersions for signal amplitude attenuation (left plot) and phase velocities (right plot) for the casing flexural and extensional modes. The frequency $F_0$ of the discontinuity on the flexural mode attenuation corresponds to a specific wavespeed on the phase velocity dispersion as shown in the right plot. The estimated value, $V_o$, corresponds to the bulk wavespeed of the cement in the annulus between casing and formation. Regardless of whether it is compressional or shear wavespeed, at around 2600 m/s the value indicates the content of the annulus is made of a solid. Other considerations show this is the compressional wavespeed of the cement, not the shear. The solid curves correspond to solutions obtained from what is known as mode search solvers for the configuration considered. The dots result from using a dispersion estimator on synthetic waveforms, for the same configuration, generated by simulating the pitch-catch measurement as described above. The dispersion estimator may include a continuous wavelet transform and/or a sparse Bayesian learning algorithm. The cement wavespeeds are chosen such that there is discontinuity in the flexural wave attenuation dispersion curve. Note that the frequency $F_0$ of this discontinuity corresponds to a specific wavespeed on the phase velocity dispersion for the flexural as shown in the right plot. The estimated value, $V_o$, around 2600 m/s, corresponds to the bulk wavespeed of the cement in the annulus between casing and formation. Regardless of whether it is compressional or shear wavespeed, at around 2600 m/s the value indicates the content of the annulus is made of a solid. Other considerations show this is the compressional wavespeed of the cement, not the shear.

Applications on Synthetic Data from Numerical Simulations

We use a numerical model to simulate the ultrasonic pitch-catch measurement on planar geometry Details are provided by "Forward modeling for ultrasonic leaky Lamb-wave based imaging through a highly contrasting steel cylindrical layer," Zeroug S., IEEE Ultrasonics Symposium, Vol. 1, pages 672-675, (2004), which is incorporated by reference herein. An idealized receiver array is used to gather an array of waveforms with equal transmitter-receiver spacing. The parameters of the numerical experiment are provided in the captions of FIGS. 8 to 10. The waveforms are then processed with a modified matrix pencil algorithm described in more detail in Ekstom, Michael "Dispersion Estimation from Borehole Acoustic Arrays Using a Modified Matrix Pencil Algorithm," Proceedings of ASILOMAR-29, IEEE 1996 pages 449-53, which is incorporated by reference herein. Plots of the velocity phase dispersion and amplitude attenuation dispersion are generated.

Figure 8:
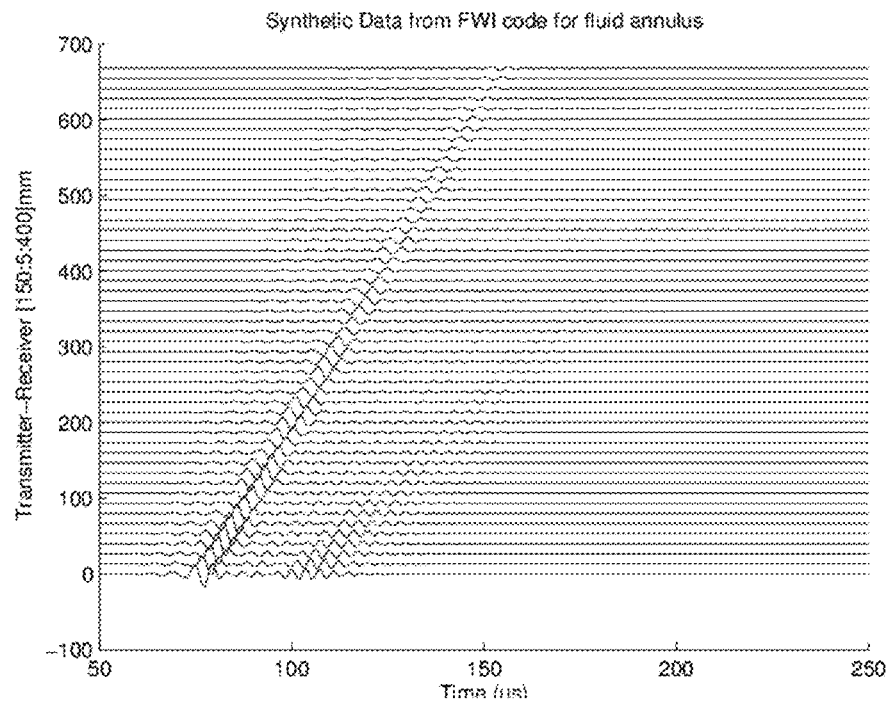
FIG. 8 is a plot of calculated signals as a function of time and transmitter-receiver spacing.
Figure 9:
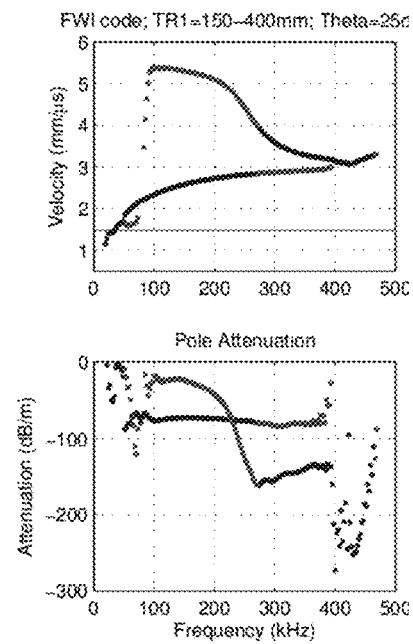
FIG. 9 is a series of plots of velocity (top) and attenuation (bottom) as a function of frequency.

FIGS. 8 and 9 show a plot of the synthetic waveform array and modified matrix pencil algorithm processing results for a case where a fluid fills the annulus. These data establish baseline plots. It can be noted that the phase velocity and amplitude attenuation for both flexural and extensional modes are well estimated. FIG. 8 is a set of waveforms synthesized for transducer alignment at 25 degrees and received with an array positioned from 150 mm to 400 mm away from the transmitter, with 5 mm inter-receiver distance. Parameters: a source pulse with center frequency at 200 kHz is used (see spectral amplitude plots in FIG. 6; casing thickness: 9.525 mm (⅜"); Acoustic parameters: Borehole fluid: vp=1480 m/s, density=1000 kg/m3; Steel: vp=5880 m/s, vs=3220 m/s, density=7800 kg/m3; Cement: as per parameters of the borehole fluid. The annulus is assumed to be infinitely thick.

FIG. 9 is a plot of dispersion curves for the waveform array in FIG. 8. The horizontal line on the phase velocity panel (top left) represents the wavespeed in the annulus—here that of a fluid. Note the attenuation for the flexural mode is stable around −70 dB/m. (Note also that the attenuation in these plots is expressed with a negative sign. Sometimes the sign is dropped as in FIG. 7.) TKO parameters: pole order=2; tolerance=40%. The horizontal line on the phase velocity panel (top left) represents the wavespeed in the annulus—here that of a fluid.

Figure 10:
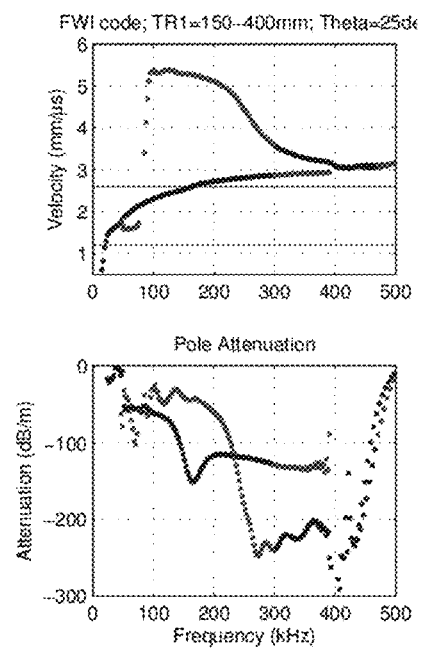
FIG. 10 is a series of plots of velocity (top) and attenuation (bottom) as a function of frequency.

FIG. 10 is a plot similar to FIG. 9, but for a cemented annulus with $v_p$=2600 m/s, $v_s$=1200 m/s, density=1200 kg/m3. Note the discontinuity of the flexural attenuation curve (lower left) at around 150 kHz below which the attenuation is stable around −50 dB/m and above which it increases to around −120 dB/m. At this frequency, the flexural phase velocity curve (top left) intersects the horizontal line that corresponds to the cement wavespeed (2600 m/s).

Applications on Experimental Array-Like Data

Data from an experiment performed in a laboratory setting is processed as per the scheme outlined above for the synthetic data. This experiment pertained to estimating the effect of disbond between steel plate and a solid annulus simulated here with a plate made of LUCITE. The experimental setup is schematized in FIG. 11 with the water-immersed transducers aligned at 35 degrees to optimally excite the flexural mode of the roughly ⅜ inch thick steel. At this angle, we expect not to excite the extensional mode of the steel plate.

Figure 11:
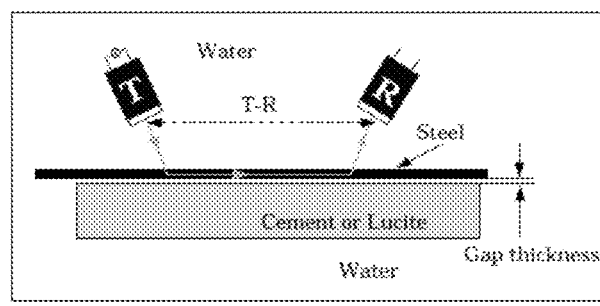
FIG. 11 is a schematic view of an apparatus for transmitting and receiving an acoustic signal in a solid plate backed by either a fluid or another solid.

FIG. 11 provides the geometry of the experimental setup conducted in a water tank. Two 1 inch diameter piston transducers are used in pitch-catch mode to excite a ⅜ inch thick 24 inch by 16 inch rectangular steel plate which is backed by a Lucite block. The steel and Lucite blocks are either clamped tightly or separated by 250 micrometer shims. In one instance, the Lucite block is removed by 1 inch away from the steel plate.

Figure 12:
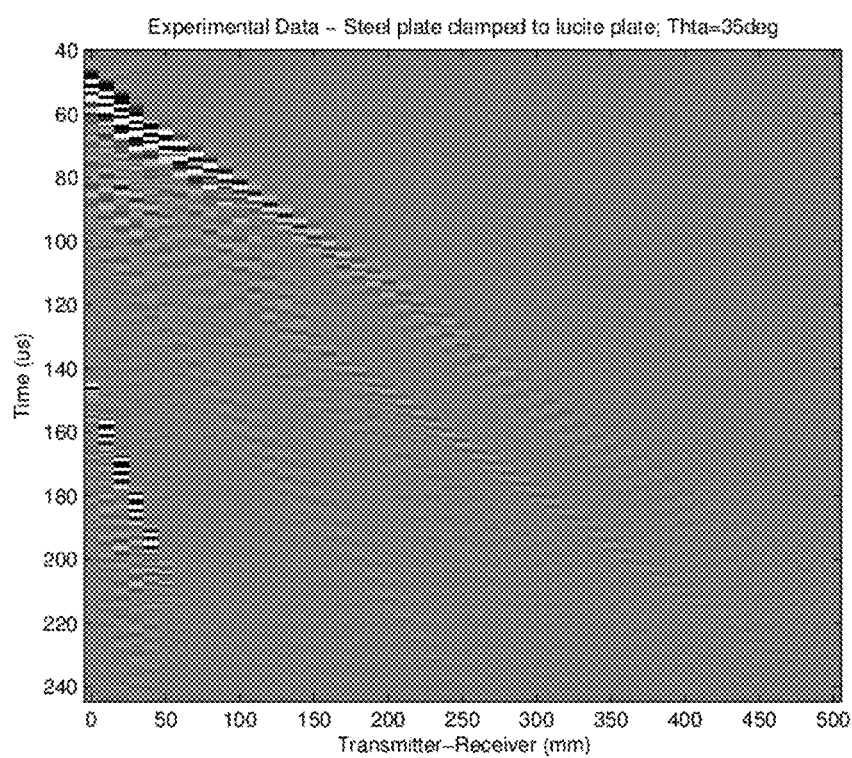
FIG. 12 is a plot of experimentally acquired signals as a function of time and transmitter-receiver in mm.
Figure 13:
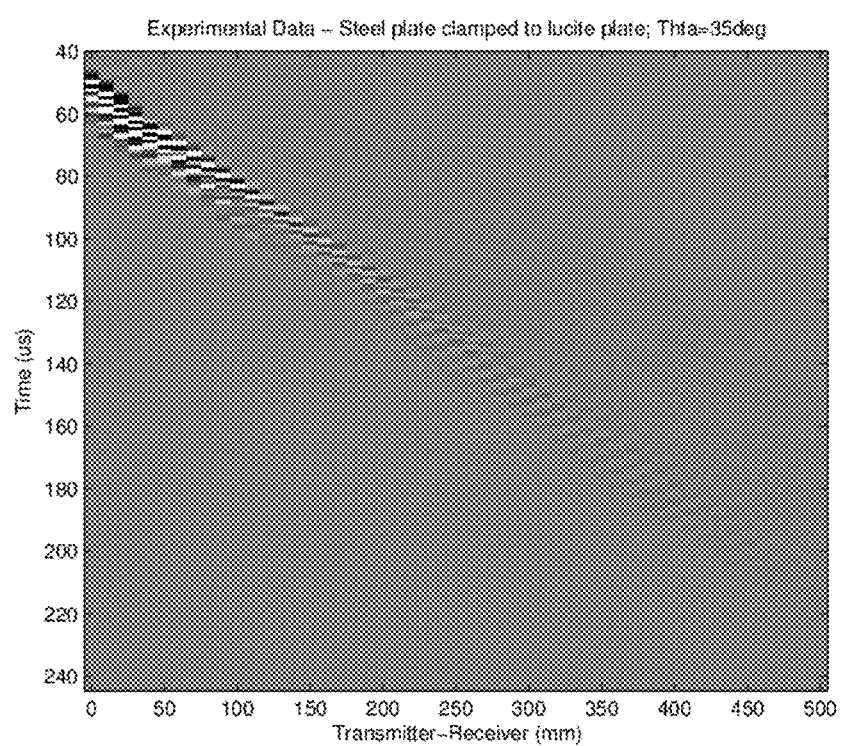
FIG. 13 is a plot of experimentally acquired signals as a function of time and transmitter-receiver in mm.
Figure 14:
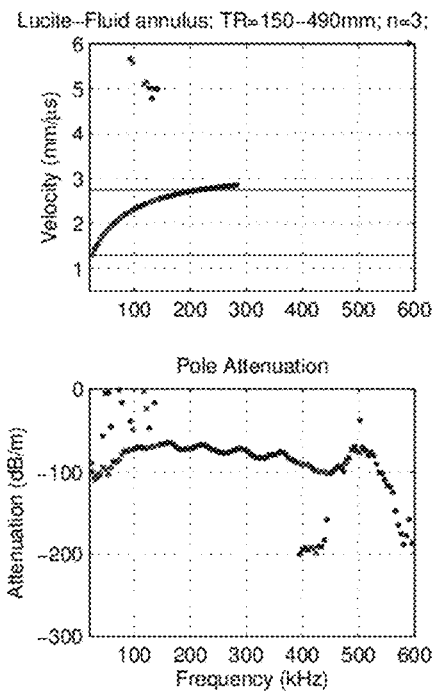
FIG. 14 is a series of plots of velocity (top) and attenuation (bottom) as a function of frequency.

The next series of figures illustrates results collected as per the configuration illustrated in FIG. 11. FIG. 12 is a gray-scaled plot of the signals detected by the receiver as it is moved away from the transmitter, generating an array of waveforms with sample rate of 10 mm. FIG. 13 is similar to FIG. 12 but the data is time-gated so as to remove arrivals after the main casing signal. This is the data that is processed through a modified matrix pencil algorithm. Next, FIG. 14 provides modified matrix pencil algorithm results for the case where the steel and Lucite block are separated by 1" fluid layer. The flexural mode is dominantly excited and detected. Its amplitude attenuation is well estimated by the modified matrix pencil algorithm varying nearly monotonically between −75 and −100 dB/m.

Figure 15:
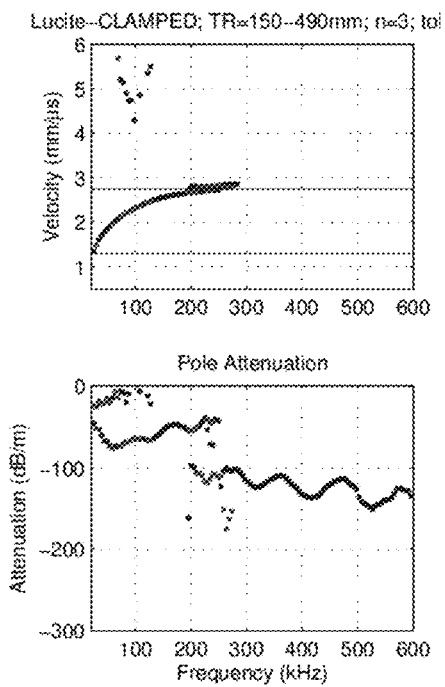
FIG. 15 is a series of plots of velocity (top) and attenuation (bottom) as a function of frequency.
Figure 16:
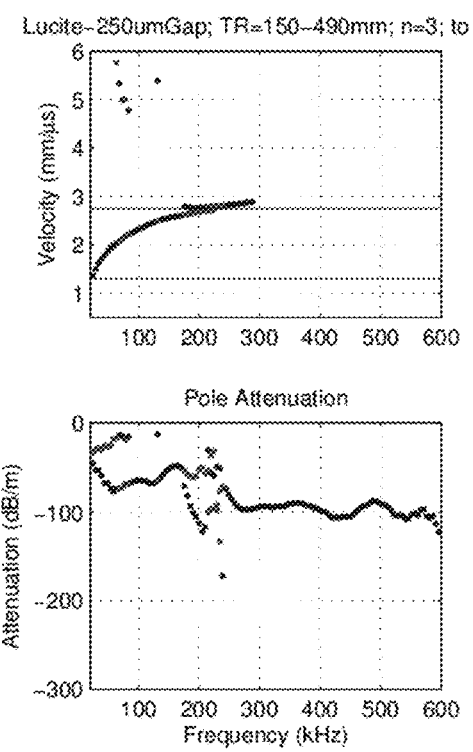
FIG. 16 is a series of plots of velocity (top) and attenuation (bottom) as a function of frequency.

Additionally, FIG. 15 includes plots of modified matrix pencil algorithm results for the case where the Lucite block is clamped to the steel plate. The flexural mode amplitude attenuation (lower left panel) exhibits a discontinuity at frequencies around 200-250 kHz. At this frequency, the phase dispersion curve (top left) intersects the 2700 m/s velocity level (shown in horizontal line), indicating the compressional wavespeed of Lucite is at or very close to this value. This value is close to the published value of 1680 m/s. (Note the shear for Lucite is known to be around 1100-1300 m/s). FIG. 16 is similar to FIG. 15 but it is for the case where the Lucite block and steel plate are separate by 250-micrometer shims simulating a bonding condition with a thin layer of fluid. Here too, the flexural mode amplitude attenuation exhibits a discontinuity at frequencies around 200-250 kHz, although the discontinuity is not as large as in FIG. 15 due to a different bonding condition.

Workflow

Figure 17:
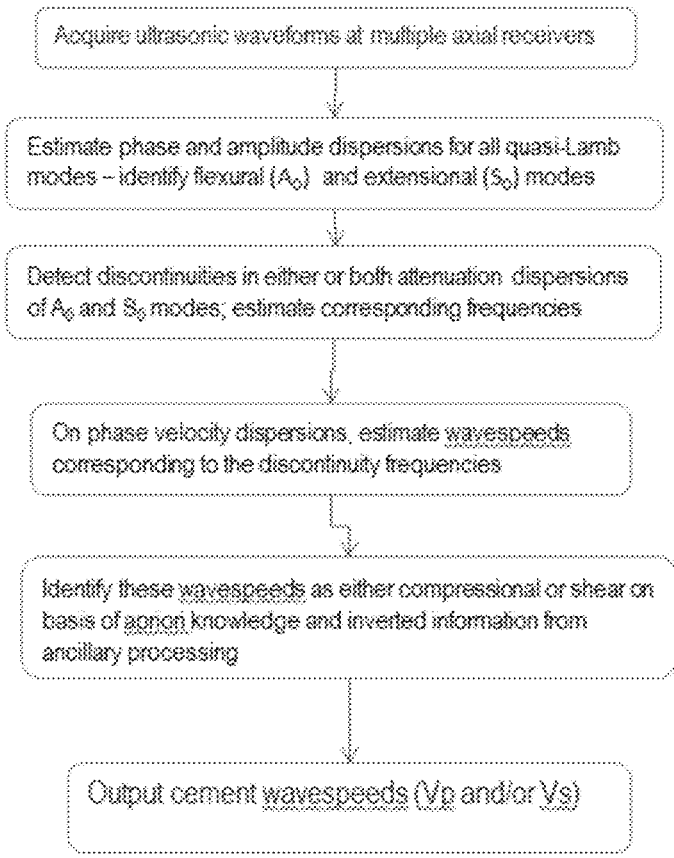
FIG. 17 is a flow chart of one embodiment of the methods described herein.

A general workflow envisaged is depicted in FIG. 17. The flowchart to estimate cement wavespeeds from attenuation dispersions of the flexural and extensional modes features methods 1601 to 1606. In some embodiments, the methods are performed in sequential order. Some embodiments may benefit from additional methods or from performing the methods in alternative arrangements. Initially, method 1601 includes collecting ultrasonic waveforms at multiple axial receivers. Method 1602 identifies flexural and extensional modes and estimates the phase and amplitude dispersion for all quasi-Lamb modes; a modified matrix pencil method such as TKO or other dispersion estimation methods can be used for this purpose. Method 1603 includes detecting discontinuities in either or both attenuation dispersions and estimating corresponding frequencies. A method such as that based on hypothesis testing for detecting a jump in the attenuation characteristic at each frequency using the estimated attenuation and/or uncertainties at those and neighboring frequencies, or other similar approaches, could be used for this purpose. Method 1604 uses the phase velocity dispersions to estimate wavespeed corresponding to the discontinuity frequency. Method 1605 characterizes the estimated wavespeed as either shear or compressional wavespeed using ancillary processing inverted information and a priori knowledge such as expected wavespeeds of the cement obtained from measurements performed prior to cementing a well. Method 1606 provides the cement wavespeed as either compressional and shear.

Modification to the Workflow for Sparse Receiver Array

The receiver array may be sparse with a small number of receivers spaced too far apart. In this instance, the data may not permit an accurate enough estimation of the wavespeed dispersions. It is however expected that the attenuation dispersion can still be estimated from the data. This is so because adequate processing of the signal phase information, responsible for the wavespeed dispersion, requires a large-enough receiver aperture with high sampling rate (e.g., a large number of receiver elements closely spaced to each other). This is not necessary for adequate processing the signal attenuation information.

In this instance, the wavespeed dispersions for the flexural and extensional modes need to be calculated. This is possible as long as the steel casing parameters, namely thickness, P and S wavespeeds and density are known. We note that these specifications are in general available and provided by the casing manufacturers. To calculate the wavespeed dispersions, we use a mode search for the Lamb problem as well known by those trained in the art. We note that for steel casings, these wavespeed dispersions are independent of the properties of the logging fluid and cement that surround the steel casing, because of the substantial elastic contrast between steel and the logging fluid and between steel and cement. Hence assuming say water on both side of the casing to calculate the wavespeed dispersions yields a good approximation to the real dispersions for which the casing is attached to cement.

Figure 18:
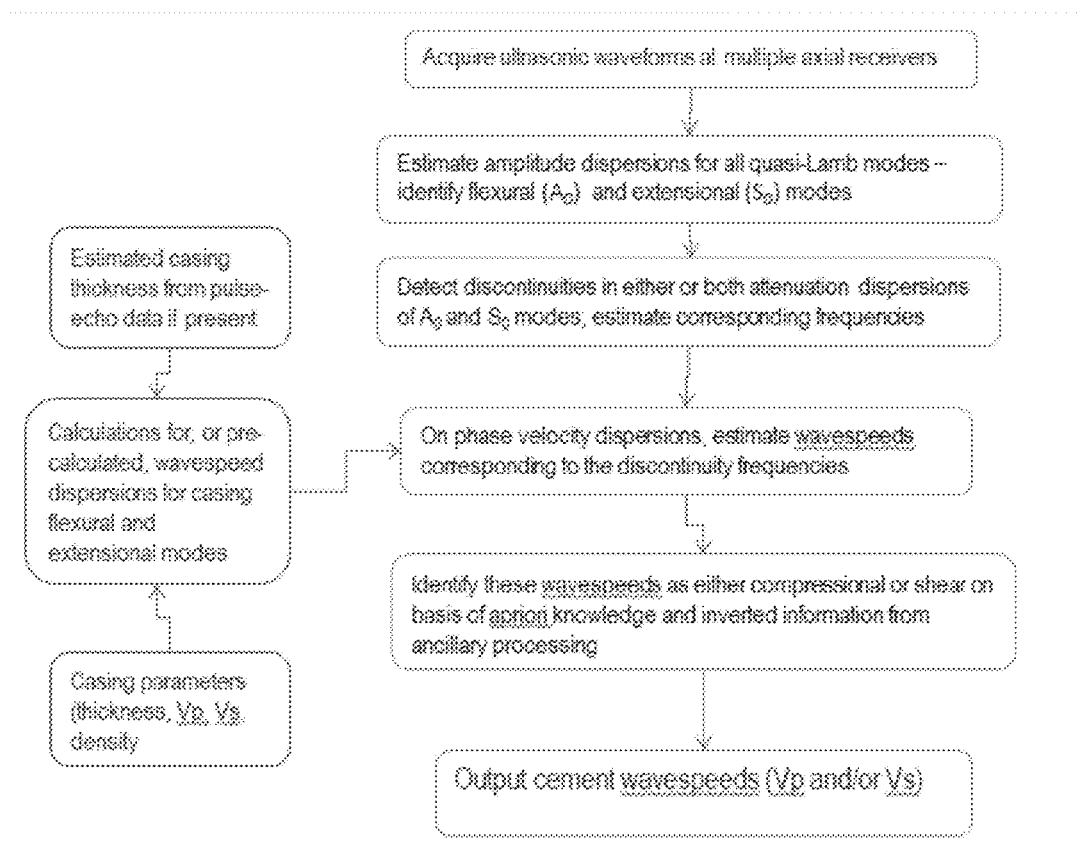
FIG. 18 is a flow chart of one embodiment of the methods described herein.

The modified general workflow envisaged is depicted in FIG. 18 which is a generic flowchart to estimate cement wavespeeds from attenuation dispersions of the flexural and extensional modes for a receiver array with sparse number of elements. The wavespeed dispersions are calculated and not estimated from the acquired data, using knowledge of the casing parameters (thickness, P and S wavespeeds and density).

Method for the Two-Receiver ISOLATIONSCANNER™ Data

Next, we review the adaptation of the same ideas to the configuration where the receivers array is made of two elements only, as is the case for the ISOLATIONSCANNER™. That is the receiver array is too sparse to allow for even the attenuation dispersion to be estimated from the data using array processing techniques. A method is demonstrated to capture with some approximation the discontinuity features at the basis of cement property determination.

The two receivers of the ISOLATIONSCANNER™ are positioned at 250 and 350 mm away from the transmitter. One method relies on the spectral amplitude ratio of the waveforms acquired at these two receivers.

Application of the Spectral Amplitude Ratio to Experimental Data

Figure 19:
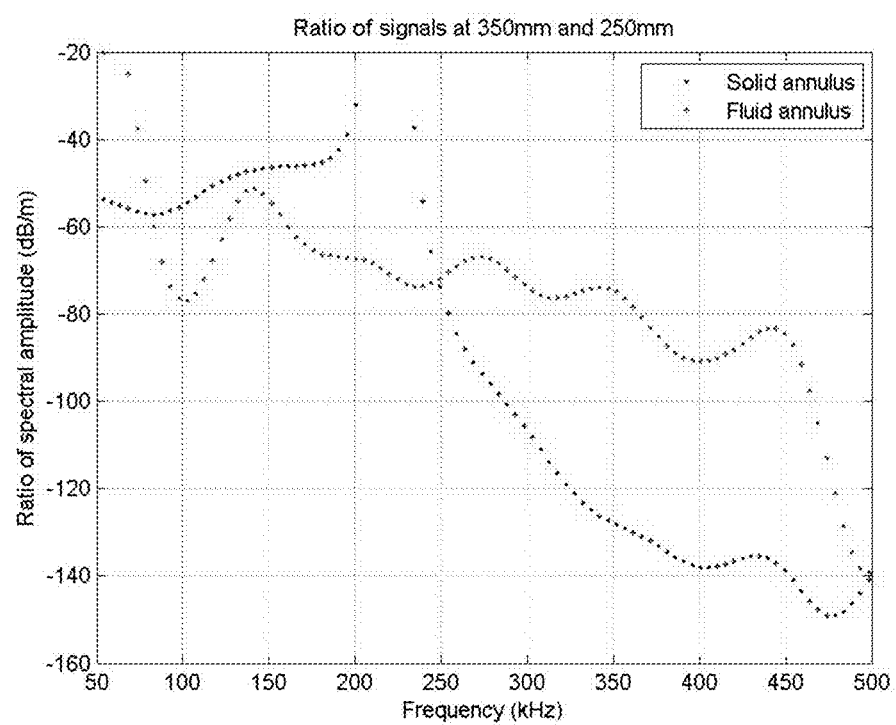
FIG. 19 is a plot of the ratio of signal spectral amplitudes as a function of frequency.

Continuing the analysis of the experimental date described above, FIG. 19 presents this ratio of the spectral amplitudes of the signals acquired at 250 mm and 350 mm expressed, for the two cases: (i) the Lucite plate is clamped to the steel plate and (ii) it is separated by a 1" thick water layer. We can make two observations: (1) the ratio captures well the range of attenuation estimated by a modified matrix pencil algorithm (ranging from 0 to −200 dB/cm); and (2) the discontinuity in the spectral variation is also present for the clamped Lucite case at frequencies between 200 and 250 kHz. FIG. 19 provides a ratio of the spectral amplitudes of the signals acquired at 250 mm and 350 mm expressed in dB/cm, for the two cases indicated in the legend. Note the discontinuity in amplitude between 200 and 250 kHz for the clamped Lucite case (i).

The presence of the discontinuity in the spectral ratio plot allows one to estimate the cement wavespeed from a two-receiver measurement (or one with a small number of receivers that does not allow array processing as per the sections above):

1—Acquire Near and Far waveforms with ISOLATIONSCANNER™.

2—For both waveforms, extract the casing arrival within a large enough window that however excludes arrivals that may have propagated within the cement sheath and reflected from the cement-formation interface or any other arrival not identified as the casing arrival.

3—Estimate ratio spectral of the Far to the Near extracted casing arrivals as per the formula:

$$ATT(f)=20*\log 10(abs(FFT(CasingArrival\_FAR))/abs(FFT(CasingArrival\_NEAR)))*1000$$

where CasingArrival_FAR and CasingArrival_NEAR are the extracted signals as per step 2 and FFT refers to the fast Fourier transform that calculates the Fourier transform of a time-domain waveform. Note as the distance between the two receivers is 10 cm, multiplying the ratio by 1000 brings the expression of the ratio to units of dB/m. Note that similar methods to the formula above can be used to estimate this ratio.

4—Plot and analyze the ratio as a function of frequency (within the meaningful range of frequencies where the signal to noise ratio is favorable) for discontinuities, using well known signal processing methods. One such method can employ hypothesis-based estimation.

5—Where a discontinuity is detected as per step 4, estimate the frequency f0 and the associated uncertainty Delta_f0

6—Assuming the data is predominantly made of the casing flexural mode, using the phase velocity dispersion curve for the casing flexural mode (calculated as per the method described above), estimate the flexural phase velocity value, Vcmt_est and its error, Delta_Vcmt_est, corresponding to the frequency f0 and its error Delta_f0.
  a. Note 1: Calculation of the phase velocity dispersion for the flexural mode of the casing can be conducted pre-logging and stored in tables of dispersions. It requires knowledge of (i) the casing thickness, (ii) the casing compressional and shear wavespeeds, and (iii) casing density. To a first-order approximation, parameters of the logging fluid and medium in the annulus (cement or otherwise) do not influence the phase velocity dispersion curves. Approximate values for the parameters (i) to (iii) can be used from the Manufacturer's specifications of the casing, without yielding too erroneous or non-useable dispersions curves. If accuracy is needed for the casing thickness, it can be estimated from the pulse-echo measurement implemented on the IsolationScanner in which case the calculation of the dispersion curves is done after logging.

b. Note 2: The phase velocity dispersions can be estimated on the fly using a mode search algorithm. An acceptable approximation can be made in assuming a steel plate in fluid—given that the phase velocity dispersions are not perturbed to any significant enough order by the cylindrical geometry of the casing and/or having the casing cemented. Alternatively, the phase velocity dispersions can be extracted from a priori computed tables of dispersions according to the parameters (i) to (iii) mentioned above.

7—This phase velocity value Vcmt_est with its uncertainty Delta_Vcmt_est correspond to the cement bulk wavespeed responsible for the existence of the discontinuity in the attenuation dispersion. Output this value as the inverted cement wavespeed.

Whether the estimated cement wavespeed represents the compressional or shear wavespeed can be ascertained from the value itself and expected values for the cement formulation used in the field:

a. Note 1: Typically surface measurements of the cement compressional, and sometimes shear, wavespeeds are taken onsite before cementing the well. These measurements can be used to ascribe the inverted cement wavespeed to the compressional or shear waves.

b. Note 2: It is known that values higher than 2500 m/s pertain to Vp and that below about 2100 m/s, to Vs. Typical values of cement Vp and Vs measured in the laboratory at ambient temperatures are listed in Table 1.

8—If the data is determined to be predominantly made of the extensional mode, instead of the flexural mode, the steps above still apply by referencing the casing mode dispersions to the extensional. The ISOLATION-SCANNER tool was designed to optimally excite and detect the casing flexural mode, the extensional mode is not expected to be dominantly excited and detected. However, where the transducer alignment angles on the logging tool to be reduced to the range around 20 degrees (for a typical logging fluid), we would expect the extensional mode to dominate the data.

Figure 20:
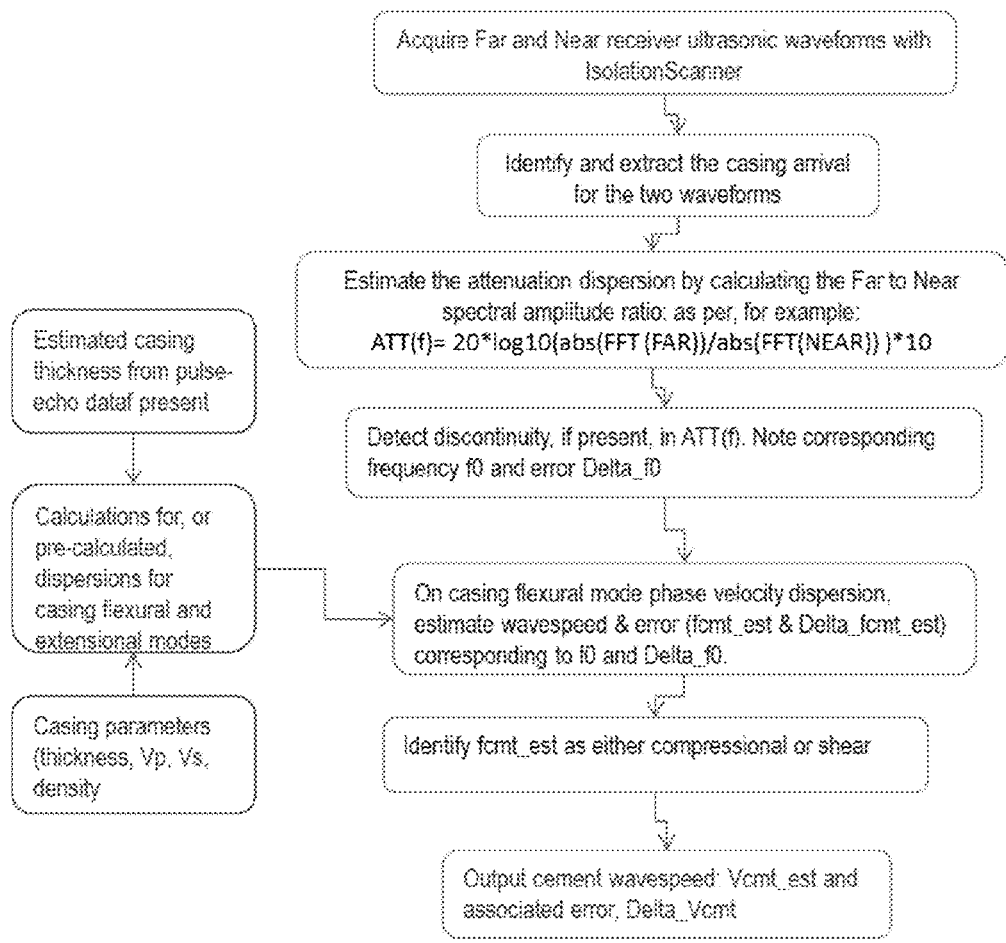
FIG. 20 is a flow chart of one embodiment of the methods described herein.

FIG. 20 provides a generic flowchart to estimate cement wavespeed from the spectral amplitude ratio scheme for the two-receiver ISOLATIONSCANNER™ data. The flowchart to estimate cement wavespeeds and associated error features methods 1901 to 1910. In some embodiments, the methods are performed in sequential order. Some embodiments may benefit from additional methods or from performing the methods in alternative arrangements. Initially, method 1901 acquires far and near receiver ultrasonic waveforms. Method 1902 identifies and extracts the casing arrival for the two waveforms. Method 1903 estimates the attenuation dispersion by calculating the far to near spectral amplitude ratio and method 1904 detects discontinuity in the attenuation dispersion and identifies the corresponding frequency and error. Methods 1905, 1906, and 1907 may be done simultaneously, individually, or separately. Method 1905 estimates casing thickness from pulse-echo data. Method 1907 introduces casing parameters such as thickness, wavespeeds, and density. Method 1906 calculates dispersion for casing flexural and extensional modes often using the results of methods 1905 and 1907. Method 1908 combines information from the methods 1904, 1905, 1906, and 1907, estimating the wavespeed and error of the velocity dispersion of the corresponding frequency and error. Method 1909 identifies the wavespeed and error as compressional or shear and method 1910 provides the cement wavespeed and the associated error.

TABLE 1

Measured compressional (Vp) and shear (Vs) wavespeeds in wellbore cements of various formulations. The values have been obtained in the laboratory under ambient conditions of temperature and pressure.

| Sample # | Vp (m/s) | Vs (m/s) |
| --- | --- | --- |
| 1 | 3736 | 2040 |
| 2 | 3854 | 2094 |
| 3 | 3186 | 1750 |
| 4 | 3100 | 1747 |
| 5 | 3550 | 1992 |
| 6 | 2786 | 1429 |
| 7 | 2848 | 1496 |
| 8 | 3064 | 1694 |
| 9 | 3158 | 1797 |
| 10 | 2851 | 1509 |
| 11 | 2952 | 1527 |
| 12 | 2867 | 1455 |
| 13 | 2883 | 1542 |
| 14 | 2916 | 1536 |
| 15 | 2193 | 1179 |
| 16 | 2248 | 1287 |
| 17 | 2921 | 1558 |
| 18 | 2518 | 1293 |

Application of the Spectral Amplitude Ratio to Field Data

Figure 21:
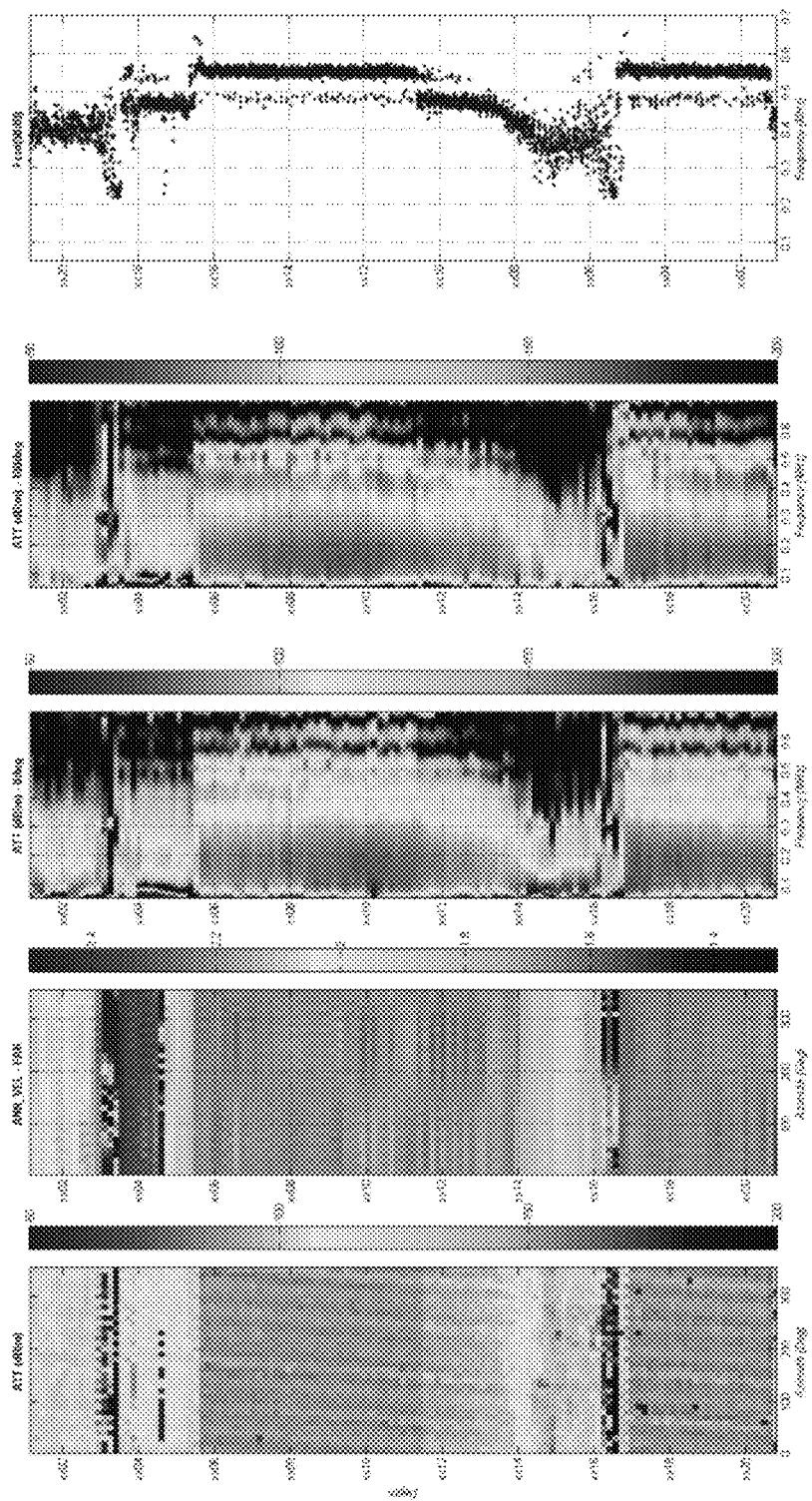
FIG. 21 is a series of plots of barrier properties as a function of subterranean depth, azimuth and frequency.

We apply the spectral amplitude ratio method described above to field data from a well. The results are shown in FIG. 21. The first panel from the left displays the conventional flexural attenuation as estimated from the ratio of the peaks of the envelope. The second panel displays the annular wavespeed inverted using processing of the third-interface (cement-formation) echo (TIE) data. The third panel displays the flexural attenuation from the spectral amplitude ratio as a function of frequency for all depths at azimuth 0 degrees. The fourth panel displays a similar image but at 180 degrees azimuth. As there are 360 azimuths associated with the tool scanning the casing every 10 degrees, images for the other 34 azimuths (not shown) are similar but show some deviations from each other. The last panel (right) displays plots of the frequency at which the attenuation increases (in absolute values) by 50 dB from the average computed in the range of 0.1 to 0.2 MHz. This frequency can be considered as proxy for the discontinuity discussed herein and which preferably is estimated from data acquired with an array of a multitude of receivers.

In the spectral amplitude ratio images (panels 3 & 4 in FIG. 21), we observe marked variations in the attenuation as a function of frequency. This reflects the data plotted in the first panel (conventional attenuation (ATT) image) but provides further information related to the cement wavespeed. As discussed above in relation to FIG. 5 and the corresponding text, a sudden increase in the attenuation, say from 50-70 dB/m to a level >150 dB/m is associated with the crossing of the flexural mode phase velocity dispersion curve, whereby below the frequency of the crossing the attenuation is low because the flexural mode does not radiate into the cement layer, whereas above the frequency of the crossing point, it does so relatively well. In a sense, the "characteristic" frequency plotted in panel 5 can be considered as a proxy for the discontinuity discussed above. We note that the attenuation image variations in panels 3 and 4 are consistent with the inverted annular wavespeed from the TIE data processing. For instance, between XX03m and XX05m, the annular wavespeed is close to 2200 m/s. This value used in conjunction with the casing flexural mode phase velocity dispersion curve (as per FIG. 5) yields a discontinuity at low frequencies (around 100 kHz) below which the attenuation is small (~<50 dB/m) and above which it increases dramatically to 100 dB/m and beyond. At other depth sections, such as —XX06-XX14m and where the annular wavespeed is close to that of a fluid (1500 m/s), there is no expected discontinuity. The attenuation is that of a fluid-filled annulus around 70 dB/m and more importantly extending over a wide frequency range (50-500 kHz) as can be observed from panels 3 and 4.

To complete the inversion workflow, this characteristic frequency (panel 5 in FIG. 21) is to be used in conjunction with the dispersion curve of the phase velocity of the flexural mode to extract a characteristic wavespeed of the cement.

The decay of the flexural mode energy is one of the key parameters that are used in the commercial processing of the ISOLATIONSCANNER™ to determine the cement properties. This decay is estimated from the ratio of the peak of the envelope of the flexural mode energy at the two receivers. However, by itself, this energy envelope decay rate leads to an ambiguous answer as the same value can correspond to a cement with a low acoustic impedance as well as one with higher acoustic impedance (i.e., the inversion result is double valued). To remove the ambiguity, the decay is typically combined with the estimated cement acoustic impedance resulting from processing of the pulse-echo measurement which is also implemented on the ISOLATIONSCANNER™. However, the latter estimation is not always robust due to the strong sensitivity of the inversion method to environmental effects such as mud acoustic impedance as well as to modeling results-based corrections stemming from the inversion reliance on a simple 1D model for the measurement. Hence, evaluation of the frequency dependence of the attenuation as expressed for instance through the spectral ratio described above, permits to remove this ambiguity and the reliance on the pulse-echo measurement.

What is claimed is:

1. A method for characterizing the physical state of a barrier comprising a casing and an annular fill installed in a borehole traversing a formation, the method comprising:
    locating an ultrasonic tool at a location in the borehole, wherein the ultrasonic tool comprises a plurality of receivers and at least one transmitter;
    activating the ultrasonic tool to form ultrasonic waveforms that comprise propagated Lamb modes within the casing, wherein the spaced receivers record the ultrasonic waveforms;
    processing the ultrasonic waveforms to obtain (i) an amplitude attenuation dispersion plot of attenuation as a function of frequency and (ii) a phase dispersion plot of phase velocity as a function of frequency;
    identifying discontinuities within the amplitude attenuation dispersion plot; and
    determining barrier wavespeeds by relating the discontinuities to barrier wavespeeds using the phase dispersion plot.

2. The method of claim 1, further comprising using the barrier wavespeeds to identify the nature of the annular fill.

3. The method of claim 1, further comprising using the barrier wavespeeds to distinguish the annular fill as solid or fluid.

4. The method of claim 1, further comprising using the barrier wavespeeds to calculate mechanical properties of the barrier.

5. The method of claim 4, wherein the mechanical properties comprise elasticity.

6. The method of claim 4, wherein the mechanical properties are selected from the group consisting of Poisson's ratio, Young's modulus and mass density.

7. The method of claim 4, further comprising repeating the activating to identify changes in the mechanical properties of the barrier over time.

8. The method of claim 7, further comprising using the changes to estimate longevity of mechanical integrity of the barrier.

9. The method of claim 1, wherein the tool comprises more than one transmitter.

10. The method of claim 1, wherein the annular fill comprises cement.

11. The method of claim 1, wherein the barrier further comprises a subterranean formation.

12. The method of claim 1, wherein the barrier comprises a surface of the casing.

13. The method of claim 1, wherein the barrier further comprises a surface of the borehole.

14. The method of claim 1, wherein the processing the ultrasonic waveforms comprises processing the ultrasonic waveforms using a modified matrix algorithm.

15. The method of claim 1, wherein processing the ultrasonic waveforms comprises processing the ultrasonic waveforms using a dispersion estimator based on a sparse Bayesian learning algorithm.

16. The method of claim 1, wherein processing the ultrasonic waveforms comprises processing the ultrasonic waveforms using a dispersion estimator based on a continuous wavelet transform.

17. The method of claim 1, wherein identifying discontinuities comprises identifying discontinuities within the amplitude attenuation dispersion plot using a hypothesis-based technique to identify discontinuities in dispersion curves.

18. The method of claim 1, further comprising:
    aligning the at least one transmitter to excite propagated Lamb modes within the casing.

19. A method for characterizing the physical state of a barrier comprising a casing and an annular fill installed in a borehole traversing a formation, the method comprising:
    locating an ultrasonic tool at a location in the borehole, wherein the ultrasonic tool comprises at least two spaced receivers and at least one transmitter;
    activating the ultrasonic tool to form ultrasonic waveforms that comprise propagated Lamb modes within the casing, wherein the spaced receivers record the ultrasonic waveforms;
    processing the ultrasonic waveforms to obtain an amplitude attenuation dispersion plot of attenuation as a function of frequency;
    identifying discontinuities within the amplitude attenuation dispersion plot; and
    determining barrier wavespeeds using the discontinuities.

20. The method of claim 19, wherein the waveforms comprise compressional or shear waves.

21. The method of claim 19, further comprising using the barrier wavespeeds to identify the nature of the annular fill.

22. The method of claim 19, further comprising using the barrier wavespeeds to distinguish the annular fill as solid or fluid.

23. The method of claim 19, further comprising using the barrier wavespeeds to calculate mechanical properties of the barrier.

24. The method of claim 23, wherein the mechanical properties comprise elasticity.

25. The method of claim 23, wherein the mechanical properties are selected from the group consisting of Poisson's ratio, Young's modulus and mass density.

26. The method of claim 23, further comprising repeating the activating to identify changes in the mechanical properties of the barrier over time.

27. The method of claim 26, further comprising using the changes to predict longevity of mechanical integrity of the barrier.

28. The method of claim 19,
wherein processing the ultrasonic waveforms comprises calculating a ratio of spectral amplitudes of signals from the at least two receivers; and
wherein the signals represent propagation of the waveforms in the casing with other events removed.

29. The method of claim 19, wherein processing the ultrasonic waveforms comprises a dispersion estimator based on a sparse Bayesian learning algorithm.

30. The method of claim 19, wherein processing the ultrasonic waveforms comprises a dispersion estimator based on a continuous wavelet transform.

31. The method of claim 19, further comprising:
aligning the at least one transmitter to excite propagated Lamb modes within the casing.

32. The method of claim 19, further comprising:
calculating a dispersion plot of Lamb mode phase velocities as a function of frequency using properties of the casing.

33. The method of claim 32, wherein determining barrier wavespeeds comprises relating the discontinuities to barrier wavespeeds using the dispersion plot.

* * * * *